2,914,410
STABILIZED ICINGS AND PREPARATION

Robert W. Butler, Wilmington, Del., assignor to Hercules Powder Company, Wilmington, Del., a corporation of Delaware No Drawing. Application December 7, 1956
Serial No. 626,809

4 Claims. (Cl. 99—139)

This invention relates to improved food products and more particularly to stabilized icings and to their preparation.

Stability as used herein means the ability of the icing product to retain in large part its foamed cellular structure, its smooth nongranular form, and to separate substantially no liquid during either storage or use. In this art the term "icing" is often used synonymously with frosting, and certain types of icing are sometimes referred to as toppings. Still other types of icing are sometimes referred to as meringues. Further, when considered according to their end use, icings fall into the following three groups: (1) Dry mixes sold for home use to make icings. These may be packaged in one or two packages and require addition of hot or cold water and perhaps edible fat. These dry mixes may or may not contain an edible fat or shortening depending on whether they are sold as butter cream types or not. (2) Dry mixes sold for use by bakers. (3) Marshallow cream type for home and fountain use. Therefore, unless otherwise specified, the term "icing" is used generically herein in this same sense as described above to include the various types.

The main ingredients of most icing include sugar, water, and a protein capable of being whipped (aerated) into a foam. The protein, such as egg whites, is referred to as a whipping or foaming agent. While a whippable protein is usually employed, it is not necessary, especially with butter cream icings. Even when no whippable protein is present, air can be whipped into the fat to form a light (foamed) icing. Other miscellaneous ingredients often used comprise skim milk, flour, flavoring, seasoning and coloring.

In addition to these basic ingredients of sugar, water and whipping agent, a stabilizer is much preferred for all icings and is an absolute necessity for practically all of them. For instance, since butter cream icings have a relatively low water content and a high fat content, they are less prone to breakdown and migration or "bleeding" of liquid and therefore have less need for a stabilizer; however, without a stabilizer, they develop an undesirable graininess due to growth of sugar crystals in the icing which results in a dulling of the surface and a loss of the smooth texture for which these icings are designed. The chief difference between groups (1) and (2) icings above is that (2) requires a higher degree of stability. Likewise, the use of a stabilizer is necessary in group (3) icings above.

Because of the importance and necessity of stabilizers for icings, the art has developed a number of them. While these stabilizers are quite helpful, they have drawbacks. Gelatin is perhaps one of the most used stabilizers, but this has the disadvantage that it requires the use of boiling water in making the icing in order to solubilize the gelatin. Further, gelatin depends upon the formation of a gel for its stabilizing action and the gel tends to make an undesirably stiff icing. Alginates have also been used for stabilization, but they have the disadvantage of being very sensitive to calcium and other inorganic ions.

An object of this invention is an improved stabilized icing and method of making. Another object is a simplified process of making icings in that with the stabilizer employed, the icings may be prepared at room temperature instead of the boiling point of water. A further object is a stabilized icing which does not depend for stability upon the formation of a gel. A still further object is an icing which retains for long periods of time its distended foam state, its liquid content and its nongraininess. These and other objects will be apparent from the description of this invention given hereinafter.

In accordance with this invention, these objects are accomplished to a remarkable degree by incorporating a water-soluble carboxymethylcellulose in an icing as a stabilizer therefor. The carboxymethylcellulose may be employed in the form of a liquid, paste or solid, and preferably in amounts of about 0.05%–5% by weight of the final icing product.

The following examples includes ways in which the invention has been practiced. However, these examples are merely illustrative and are not to be construed as limiting the invention. Degree of substitution (D.S.) used herein means the average number of hydroxyl groups present per anhydroglucose unit of cellulose which have been substituted by ether groups, there being complete substitution of the cellulose. Of course, cps. is viscosity in centipoises, and it was measured at 25° C. in a water solution. In Examples 1, 2, 3 and 5, the viscosity was measured in a 1% by weight concentration of the sodium salt of carboxymethylcellulose in water and in Examples 4 and 6 this concentration was 2%.

Example 1

| Ingredients: | Weight percent |
|---|---|
| Bag I— | |
| Dried egg albumen | 2.0 |
| Superfine cane sugar | 15.2 |
| Citric acid | 0.07 |
| Sodium chloride | 0.15 |
| Bag II— | |
| Confectioners' sugar | 33.33 |
| Corn syrup | 13.0 |
| Sodium salt of carboxymethylcellulose (0.88 D.S. and 2500 cps.) | 0.25 |
| Water added | 36.0 |
| | 100.00 |

Example 2

| Bag I— | |
|---|---|
| Dried egg albumen | 2.0 |
| Superfine cane sugar | 12.1 |
| Corn syrup | 3.04 |
| Cream of tartar | 0.27 |
| Sodium chloride | 0.09 |
| Sodium salt of carboxymethylcelluose (0.88 D.S. and 2500 cps.) | 0.20 |
| Bag II— | |
| Confectioners' sugar | 44.54 |
| Pregelatinized potato starch | 1.52 |
| Powdered vanilla | 0.24 |
| Water added | 36.0 |
| | 100.00 |

Examples 1 and 2 above illustrate two types of dry mix which are particularly adapted to the retail market. These icings were prepared by adding water at room temperature to the contents of Bag I in a Sunbeam Mixer and whipping at high speed until the mixture formed stiff peaks (3–5 min.). The mixer was then turned to a slow speed and the contents of Bag II added in a slow stream. The mix was again whipped at the highest speed until stiff peaks formed (1–3 min.). In Example 1, vanilla extract to taste was beaten into the icing. Both icings had very good quality with good texture and decorating properties and were completely stable for over 72 hours. Without the carboxymethylcellulose stabilizer, both of these formulations showed substantial structure breakdown and separation of liquid within 24 hours.

The addition of the carboxymethylcellulose to Bag II is generally preferred as this permits easy whipping of a foam from Bag I prior to the addition of the carboxymethylcellulose.

Example 3

| Ingredients: | Weight percent |
| --- | --- |
| Shortening | 14.9 |
| Nonfat milk powder | 4.0 |
| Sodium chloride | 0.1 |
| Sodium salt of carboxymethylcellulose (0.88 D.S. and 2500 cps.) | 0.1 |
| Water added | 10.0 |
| Powdered sugar | 70.9 |
| | 100.0 |

Example 3 above illustrates a butter cream type of icing containing approximately 15% of fat, no whipping protein, and stabilized with carboxymethylcellulose. The carboxymethylcellulose was thoroughly mixed with the milk powder and sodium chloride and the resulting mixture was added to the shortening. This mix was creamed lightly and the water slowly added with mixing. The powdered sugar was then slowly sifted in with mixing and household vanilla to taste added at the end.

The product was of good quality and possessed a high gloss. A control sample containing no carboxymethylcellulose was dull and developed graininess within 72 hours, while the stabilized sample was stable for over 168 hours, retained its high gloss, and developed no graininess during this time.

Example 4

| Ingredients: | Weight percent |
| --- | --- |
| Dried egg albumen | 2.0 |
| Superfine cane sugar | 49.56 |
| Corn syrup | 12.2 |
| Cream of tartar | 0.33 |
| Sodium chloride | 0.09 |
| Pregelatinized potato starch | 1.52 |
| Sodium salt of carboxymethylcellulose (1.36 D.S. and 250 cps.) | 0.3 |
| Water added | 34.0 |
| | 100.00 |

Example 4 above illustrates the use of carboxymethylcellulose in a dry mix for a household icing with all the ingredients in a single package. This was prepared by adding the water at room temperature to the above ingredients which had been well premixed. The mix, after being thoroughly wet out, was whipped in a Sunbeam Mixer at high speed until stiff peaks formed when the beater was raised (3–5 min.). This icing had good texture and handling characteristics and was completely stable for over 96 hours. Without carboxymethylcellulose, this icing separated liquid within 24 hours.

Example 5

| Ingredients: | Weight percent |
| --- | --- |
| Dried egg albumen | 1.5 |
| Powdered sugar | 56.72 |
| Corn syrup | 4.5 |
| Cream of tartar | 0.25 |
| Pregelatinized potato starch | 1.5 |
| Sodium chloride | 0.1 |
| Sodium salt of carboxymethylcellulose (0.88 D.S. and 2500 cps.) | 0.18 |
| Powdered vanilla | 0.25 |
| Water added | 35.0 |
| | 100.00 |

Example 5 above illustrates a type of dry mix that is especially suitable for use by bakers. The more efficient whipping equipment generally used by bakers would permit a reduction in the amount of egg albumen and carboxymethylcellulose stabilizer. When prepared in a Hobart Kitchenaid Mixer, this icing obtained a density of 0.35 in 3–5 min. and had a pH of 5.2. The product was of good quality and was completely stable for over 72 hours. Without carboxymethylcellulose stabilizer, this product was unstable and separated liquid within 24 hours.

Example 6

| Ingredients: | Weight percent |
| --- | --- |
| Part I— | |
| Dried egg albumen | 1.54 |
| Corn syrup | 8.0 |
| Water | 10.08 |
| Sodium chloride | 0.1 |
| Tartaric acid | 0.02 |
| Part II— | |
| Corn starch | 1.54 |
| Corn syrup | 15.4 |
| Water added | 8.0 |
| Sodium salt of carboxymethylcellulose (0.79 D.S. and 43 cps.) | 1.44 |
| Part III— | |
| Corn syrup | 53.88 |
| | 100.00 |

Example 6 above illustrates a marshmallow cream icing of the type that may be sold in a prepared form. This type is used by the housewife or as a base for preparing fountain or bakers' icings. In this example, the carboxymethylcellulose was premixed with the corn starch and added to the water and corn syrup of Part II. This mixture was then heated to a boil and the corn syrup of Part III added. The resulting mix was cooked to 230° F. and then slowly poured with slow beating onto the ingredients of Part I which had previously been whipped to a foam. The final mix was whipped until the density was 0.50, then stored in sterile bottles. This icing was completely stable for 28 days while another sample which contained no carboxymethylcellulose stabilizer became unstable and began to separate liquid after only 3 days of storage.

Following essentially the same conditions of Example 6, except that only 0.05% of the carboxymethylcellulose was employed, the final whipped mix stored in sterile bottles was completely stable for 168 hours.

It is apparent from the data in Examples 1, 2, 4 and 5 that the addition of carboxymethylcellulose has imparted a stability to the icings which would make them quite acceptable in the trade, whereas samples without this stabilizer separated liquid upon storage overnight and would be unacceptable. In Example 6, the marshmallow cream icing, which was stable for only 72 hours without carboxymethylcellulose was stable for 672 hours when this stablizer was added. In Example 3, an unstabilized butter cream icing developed graininess in 72 hours, whereas the same type with carboxymethycellulose as stablizer was stable for over 168 hours.

Any nontoxic water-soluble carboxymethylcellulose may be used instead of or combined with the sodium salt employed in the examples. Thus, all the alkali metal salts and ammonium salts have been found to be suitable. In addition to the freely water-soluble varieties, water-dispersible forms of carboxymethylcellulose, such as, for example, a water dispersed calcium or magnesium salt or the water-dispersible free acid carboxymethylcellulose, have also been found to be suitable; however, the use of the sodium salt of carboxymethylcellulose is preferred.

As will be noted, the sodium salt of carboxymethylcellulose used in the above examples had a substitution of 0.79–1.36 and a wide range in viscosity, but these properties are not critical. Although carboxymethylcellulose having a substitution of about 0.2–1.7 is satisfactory, 0.6–1.3 is preferred. Of course, the carboxymethylcellulose must be substantially completely soluble in water. Viscosity is less significant than substitution.

The concentration of carboxymethylcellulose required for imparting the desired stabilization to the icings is more important than its D.S. or viscosity and is expressed as percent by weight of the final product icing. The concentration of carboxymethylcellulose applicable is 0.05%–5.0%. Below this range the stabilization is inadequate, and above this range undesirable stickiness is apt to occur. Generally speaking, the stabilizing action of the carboxymethylcellulose increases with increase in concentration.

As stated hereinbefore, viscosity is not critical and carboxymethylcellulose of any viscosity is applicable to this invention. This applies equally well to particle size, although carboxymethylcellulose of small particle size, e.g. not less than 80% through 200 mesh screen, is generally preferred (two hundred 0.0029 inch openings per linear inch, U.S. standard sieve series). The preferred concentration and viscosity depend on a number of factors, including the particular type of icing being prepared and method used in preparing the icing. Usually high viscosity type carboxymethylcellulose is preferred, e.g. about 1300–2200 cps. (in 1% water solution at 25° C.), and a concentration of approximately 0.15%–0.25%. For butter cream icings, 0.05%–0.15% high viscosity carboxymethylcellulose is preferred. In the case of a dry mix sold for the preparation of whipped icing where one bag of mix containing the carboxymethylcellulose is used to prepare the foam and a second bag containing sugar is added thereto, it was found that a carboxymethylcellulose of 100–300 cps. (in 1% water solution at 25° C.) gave maximum stabilization with minimum viscosity build-up in the foam base.

As indicated hereinbefore, the carboxymethylcellulose may be used in the solid or solution form. When added in solid form, as is usual in preparing dry mixes for use in the retail or bakers' trade, desirably the carboxymethylcellulose is thoroughly mixed with the dry ingredients to promote uniform and maximum dispersion of the stabilizer. Where dry mixes are packaged in two bags, the carboxymethylcellulose may be incorporated in either or both bags as desired.

The ingredients and methods of preparation given in the examples are not intended to constitute limitations to the invention but rather to illustrate the stablizing effect of the carboxymethylcellulose which will operate in any system of the general types described. For example, any of the commercially available sugars, such as sucrose, maltose, corn syrup solids, fructose, dextrose, and the like, may be used in these formulations. Sucrose is preferred as the primary sugar because of its ease of handling and sweetness. Starches other than pregelatinized potato starch may also be used in these systems. Tartaric acid and acidifying agents other than the citric acid and cream of tartar specified in the examples may be used. The preferred pH range for the final icings was found to be 4.6–5.2 but is not to be considered as restricted to this pH range, nor is pH critical.

The whippable proteins which may be used in this invention are egg albumen, modified caseins, modified soy proteins, and the like. Best results have so far been obtained with egg albumen. The whippable protein may be used in varying amounts depending on the modification desired, and the egg albumen will be used preferably in amounts of 0.5%–3% by weight of the final icing product.

The carboxymethylcellulose stabilizer of the present invention is particularly adapted for use with dry mixes where all the ingredients are compounded into a single package or into two packages. The carboxymethylcellulose is effective if placed in either package of a two-package system, but for ease of preparation, addition to the second package is preferred. It will be appreciated that this stabilizer may be marketed along with one or more of the ingredients, leaving addition of the other ingredients to the housewife or other user.

The amount of water added to the dry mixes will vary widely, e.g. about 5%–45% by weight of the final icing product. Icings comprising 35%–40% added water are perhaps more common. However, butter cream icing usually will contain about 5%–20% added water.

The instant invention possesses a number of outstanding advantages. It provides an icing having excellent stability; that is, for long periods of time the product maintains its foamed state and smooth nongranular structure and also separates substantially no liquid during either storage or use. A further important advantage is that the present invention provides a greatly simplified means of making such a product, since room temperature may be used instead of 212° F. or above.

Since it will be readily apparent to those skilled in this art that a number of variations may be made in this invention as described above within the spirit and scope thereof, it will be understood that the invention is not to be limited to the foregoing disclosure except as defined in the appended claims.

What I claim and desire to protect by Letters Patent is:

1. A noncook instant icing composition comprising sugar, a whipping agent and as a stabilizer a water-soluble carboxymethylcellulose.

2. The composition of claim 1 wherein the amount of said carboxymethylcellulose is 0.075%–7.5% by weight of the total composition.

3. The composition of claim 1 wherein the degree of substitution of said carboxymethylcellulose is 0.6–1.3.

4. In the process of preparing, from a composition including a foaming agent, a foamed icing characterized by maintaining substantially unchanged for long periods of time during storage and use, its smooth, nongranular texture, its foam structure and its liquid content: the improvement which comprises incorporating in the icing a water-soluble carboxymethylcellulose having a degree of substitution of 0.6–1.3 as a stabilizer therefor, the entire process being carried out at about room temperature.

References Cited in the file of this patent

UNITED STATES PATENTS

| | | |
|---|---|---|
| 2,355,547 | Musher | Aug. 8, 1944 |
| 2,548,865 | Burt | Apr. 17, 1951 |
| 2,588,419 | Sevall et al. | Mar. 11, 1952 |
| 2,789,911 | Toulmin | Apr. 23, 1957 |

UNITED STATES PATENT OFFICE
CERTIFICATE OF CORRECTION

Patent No. 2,914,410                                                                November 24, 1959

Robert W. Butler

It is hereby certified that error appears in the printed specification of the above numbered patent requiring correction and that the said Letters Patent should read as corrected below.

Column 1, line 31, for "Marshallow" read -- Marshmallow --; line 36, for "icing" read -- icings --; column 2, line 19, for "includes" read -- include --; line 25, for "there" read -- three --.

Signed and sealed this 10th day of May 1960.

(SEAL)
Attest:

KARL H. AXLINE                                          ROBERT C. WATSON
Attesting Officer                                   Commissioner of Patents